J. C. CALDWELL.
ARTIFICIAL BAIT.
APPLICATION FILED SEPT. 12, 1919.
1,390,601. Patented Sept. 13, 1921.
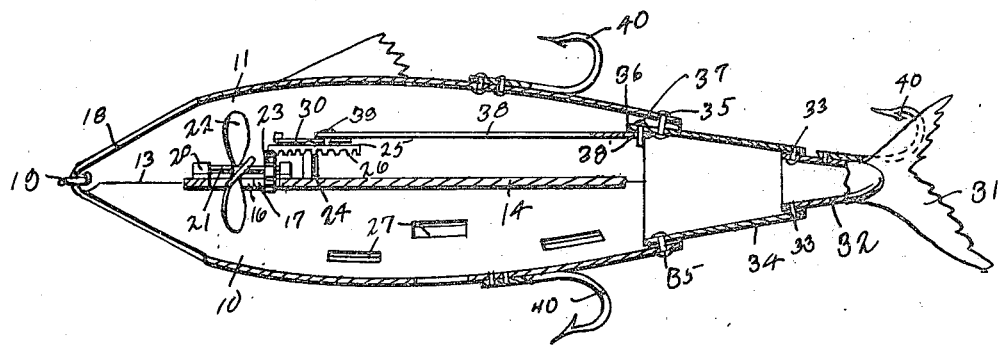
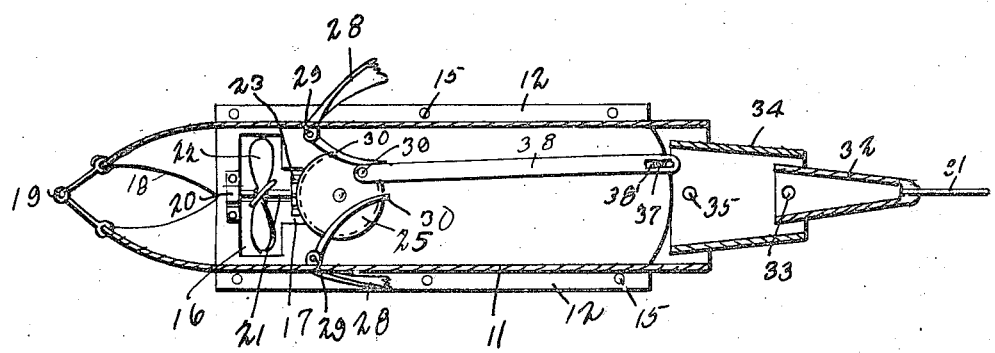
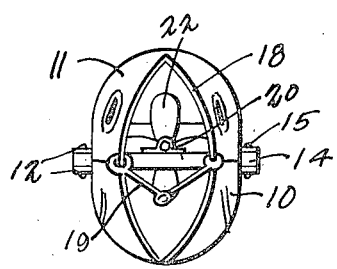 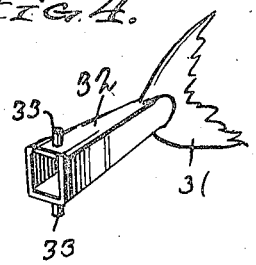
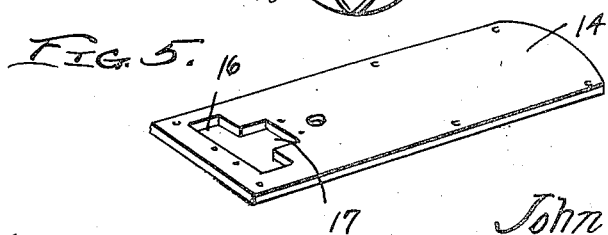
Inventor
John C. Caldwell

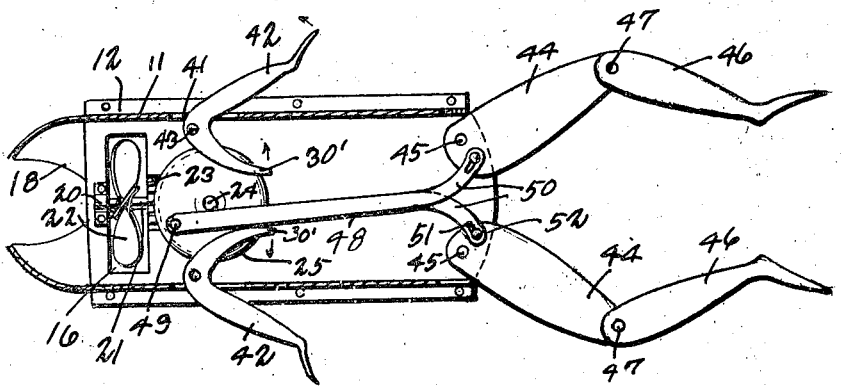
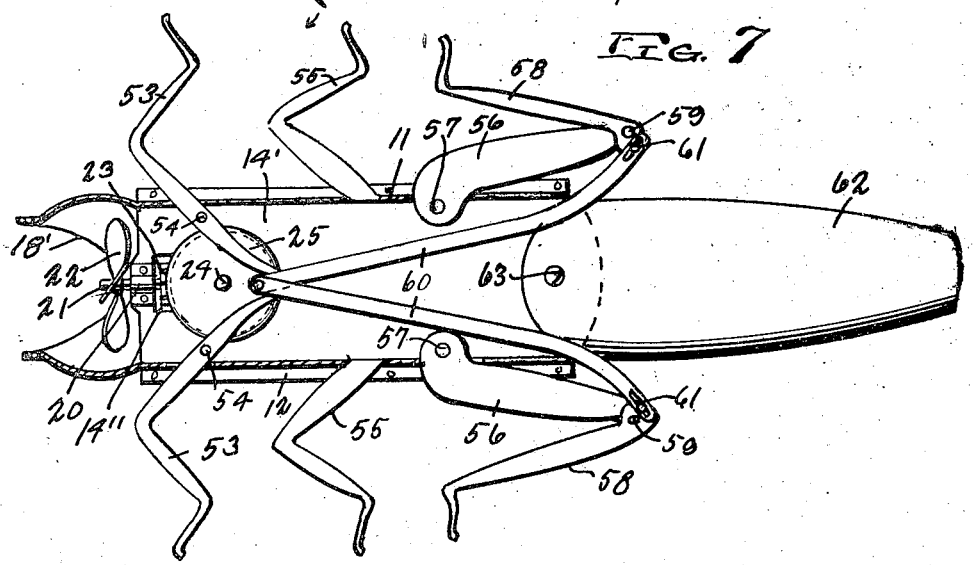
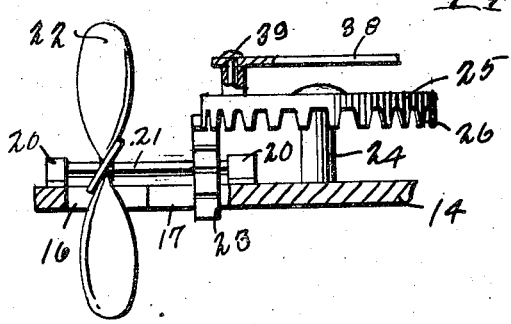

UNITED STATES PATENT OFFICE.

JOHN C. CALDWELL, OF MIAMI, FLORIDA.

ARTIFICIAL BAIT.

1,390,601.　　　　Specification of Letters Patent.　　Patented Sept. 13, 1921.

Application filed September 12, 1919.　Serial No. 323,242.

*To all whom it may concern:*

Be it known that I, JOHN C. CALDWELL, a citizen of the United States, residing at Miami, in the county of Dade and State of Florida, have invented certain new and useful Improvements in Artificial Bait, of which the following is a specification.

This invention relates to artificial bait and has for its principal object the production of figures imitating minnows, frogs, grasshoppers and the like wherein the fish recognizing such as food will approach the bait and grab the same without hesitancy.

Another object of this invention is the production of artificial bait wherein the figures are provided with movable legs or tails, thus giving the bodies life-like movement when the same are in operation.

Another object of this invention is the production of artificial bait wherein the fins and tails or the legs will be pivoted upon the body and provided with driving means so arranged as to give the same a movement which is rather jerky, thus making the movement more lifelike and thus attracting fish to the bait which recognize the jerky movements, although they would possibly be frightened in the event the movement was even and unlike the usual lifelike action.

Another object of this invention is the production of artificial bait wherein a main driving disk is provided and is actuated by a propeller, while the several driving connections are all connected to this disk from which the power to move the fins and tail or the legs is all obtained.

A still further object of this invention is the production of artificial bait, wherein various means are provided for assembling the body and holding the same in a correct position and at the same time allow the fins and tail or the legs to be movably mounted thereon.

Several practical forms of construction and assembly of the present invention will be hereinafter described and are illustrated in the drawing, in which Figure 1 is a longitudinal section through artificial bait in the form of a minnow, made in accordance with the present invention.

Fig. 2 is a horizontal section taken through the device shown in Fig. 1.

Fig. 3 is a front elevation of the device shown in Fig. 2.

Fig. 4 is a detail perspective view of a portion of the tail of the artificial bait representing a minnow.

Fig. 5 is a detail perspective view of a certain plate used in the assembly of the body of each form illustrated.

Fig. 6 is a horizontal longitudinal section through the body of a slightly modified form illustrating a frog.

Fig. 7 is a horizontal view through another form illustrating a grass hopper.

Fig. 8 is an enlarged fragmentary section through a portion of the device illustrating the manner in which the propeller is employed for driving the disk.

In the preferred embodiment of the present invention, about to be specifically described, together with the several slight modifications thereof it should be understood that the body portions are similarly constructed with the exception of the head portions thereof which may be suitably shaped to indicate different forms of bait, for as shown in Fig. 3 the device illustrates a minnow, whereas in Figs. 6 and 7 a frog and a grass hopper are illustrated respectively.

Attention is invited to Fig. 1 where it will be seen that the body comprises a bottom section 10 and a back section 11. As above stated the device shown in Figs. 1 to 5 inclusive represents a minnow or small fish. The sections 10 and 11 have outwardly extending spaced flanges 12 intermediate their ends, although beyond the flanges the edges of the sections 10 and 11 are brought together as shown at 13. A supporting platform 14 is provided, the construction of which is clearly illustrated in Fig. 5. This platform 14 is elongated and the side edge portions thereof are received between the flanges 12 as illustrated in Fig. 3 while rivets 15 pass through the flanges and also through the platform 14, thus connecting the sections together and supporting the platform in a fixed position within the body as shown in Figs. 1, 2 and 3. This platform is provided with a transverse slot 16 adjacent the forward end communicating with a pocket 17, for purposes to be set forth.

As shown in Fig. 3, the sections 10 and 11 are open as indicated at 18 to form a mouth for the minnow and for the purpose of allowing the water to rush therethrough as the minnow is pulled forwardly by the connectors 19 to which the usual line is secured.

The driving means is the same for all forms of the device and for this reason attention is invited particularly to Fig. 8. In this figure it will be seen that brackets 20 are provided upon the platform 14 and carry the propeller shaft 21, upon which the propeller 22 is keyed. This propeller extends through the slot 16 as illustrated in this figure and also in Figs. 1, 2, and 6. A pinion 23 is also keyed upon the propeller shaft 21 and is rotatable within the notch 17. A vertical supporting post 24 is mounted upon the platform 14 and carries the disk 25 rotatable upon its upper end, this disk having an unobstructed upper surface although it is provided with an annular rack 26 upon its lower surface meshing with the pinion 23. Therefore, as the minnow is being drawn forwardly through the water, the force of water against the propeller 22 will rotate the same and thus cause rotary motion to be imparted through the shaft 21 and the pinion 23 to the disk 25 as is apparent. In order to allow the water which passes through the mouth 18 of the minnow to easily escape the sections may be provided with slots 27 therein as illustrated in Fig. 1 and it is obvious that the other forms of the invention may likewise be provided with slots for preventing such escape.

The back section 11 is provided with fins 28 pivoted thereon as indcated at 29, it being noted that the fins extend beyond the side portions of the minnow body as illustrated in Figs. 1 and 2. Fingers 30 extend from the inner end of the minnows and are curved rearwardly, although projecting toward the center of the platform and above the top of the disk 25. The tail 31 has a stock 32 provided with vertical pivot pins 33. These pivot pins are connected to an enlarged stock receiving section 34 which in turn is pivoted as indicated at 35 within the rear end of the body of the minnow. This stock section 34 has an extension 36 provided with a pin 37 received at the rear end of the link 38 as shown in Fig. 1. This link is provided with a slot 38' in its rear end through which the pin 37 extends. The forward end of this link is pivotally mounted as shown at 39 upon the disk 25 adjacent the periphery thereof, whereby as the disk is rotated the link 38 will be reciprocated while the forward end thereof will also be oscillated. The forward end of the link 38 extends between the fingers 30 of the fins 28 as shown clearly in Fig. 2.

Hooks 40 are mounted upon the body in any desired position and also upon the tail as illustrated clearly in Fig. 1.

When this form of the invention is in use, it may be placed in the water in the usual manner and may be drawn forwardly by the connectors 19 to which the usual fishing line is secured. As water passes into the body of the minnow through the mouth 18 it will strike upon the propeller and will cause rotary motion to be imparted by the propeller through the connections and to the disk 25 as above set forth. As this disk 25 rotates, the reciprocation of link 38 will cause the stock secton 34 to be swung in a horizontal manner upon the pivot due to the extension 36 which is off center with respect to the pivot of the stock section. As this stock section is swung to one side it will in turn swing the stock 32 to one side, the momentum being gathered by the stock 32 causing the same to continue to swing so that the tail 31 will be swung farther to one side than the stock section 34. A reverse movement of the link as the disk continues to rotate will swing the tail in the opposite direction through the movement of the stock section and the stock. It will be understood however that owing to the extension of the pin 37 within the slot 38' of the link and also the manner in which the stock section is connected to the body and the stock is pivoted upon the stock section the tail will be given a swinging or striking movement similar to the ordinary life like movement of the tail of a minnow. As the forward end of the link is being oscillated due to its movement around and above the disk 25, it will strike the inner portions of the fingers 30 of the fins 28, striking first one finger and then the remaining finger so that the fins will be caused to have a jerky swinging motion, being suddenly thrown forwardly and then moved rearwardly by water pressure thereagainst, whereby a very life like movement on the part of the fins will be produced.

Attention is now invited to Fig. 6 wherein the usual body construction and platform as well as the driving connection illustrated in Fig. 8 is herein produced, the only difference being in the disclosure of artificial bait in the form of a frog rather than a minnow. Therefore, the back section 11 has side slots 41 therein through which the legs 42 pass and are pivoted as shown at 43 with their fingers 30' extending above the disk 25. The rear end of the body is open as is the case in the device shown in Figs. 1 and 2 but instead of the provision of a tail and the stock and stock sections therefor, legs are provided. Each leg comprises a thigh section 44, which is pivoted as shown at 45 upon the rear end of the platform 14. A calf section 46 is pivoted as shown at 47 upon the outer end of the thigh section 44, there being two such legs as shown clearly in Fig. 6. The link 48 is pivoted as shown at 49 upon the disk 25 extending between the fingers 30' of the front legs 42. This link is provided with branches 50 at its rear end which are slotted as shown at 51 whereby pivot pins 52 passing through the slots 51 and are connected to the inner ends of the legs, spaced from the pivots 45 of the legs. In this form as the disk 25 is rotated in the manner above specified, it will be seen that the reciprocation of the link 48 will cause the leg sections to be swung inwardly and outwardly, and as the pins 52 pass through the slots and as the calf sections 46 are loosely pivoted upon the outer ends of the thigh sections 44 a jerky motion of a life-like nature will be provided for the legs of the frog body. The operation of the forward end of the link 48 will also cause the link to strike first one finger 30' and then the remaining finger driving the same toward the inner walls of the body, whereby the outer portion of the front legs 42 will be forced forwardly and then may drift rearwardly by the pressure of water thereagainst operating in a manner similar to that in which a minnow body operates.

Attention is invited to Fig. 7 wherein the body is constructed in the form of a grass hopper. In this form the platform 14 is constructed slightly different from the preferred construction thereof, owing to the necessity of placing the propeller near the mouth 18' of the grasshopper model in order to provide sufficient space for additional legs for the device. The forward legs 53 are rather long and pass through slots in the back section 11, being pivoted as shown at 54 to the platform and having their inner ends extending above the disk 25. A platform 14' is provided with a slot 14" in which the pinion 23 is mounted, although the propeller shaft 21 is not provided with the forward bearing 20 as is the case with the preferred form. Stationary intermediate legs 55 are connected to the body as shown in Fig. 7. The rear legs comprise thigh sections 56 pivoted as shown at 57 to the platform, while the calf sections 58 are pivoted as shown at 59 upon the outer rear end of the thigh sections 56. The driving links 60 are pivoted upon the disk 25 and as a pair of links are provided, they extend from the rear end of the body to be connected to the inner ends of the calf sections 58. Accordingly, when the disk is rotated, it will draw upon the links, pulling the same forwardly and then forcing the same rearwardly, and this action will cause the legs to be moved considerably, with the greater movement being imparted to the calf sections 58. The connection is through the usual slotted arrangement shown at 61, while it will be noted that a tail section 62 pivoted as shown at 63 may be provided for this form of bait. The positioning of the inner ends of the forward legs over the disk will cause the forward end of the links during their operation to strike the inner ends and thus swing the outer ends of the forward legs, although this movement of the forward legs will be of a jerky nature as has been specified in the other forms of the invention.

It is known that various species of fish desire various kinds of food and for this reason various forms of the present artificial bait may be produced without departing from the spirit of the invention. The essence of the device resides in the particular drive wherein the fins, tail or legs will all be given jerky motions quite similar to life like actions on the part of minnows, frogs, grass hoppers, etc. It will therefore be seen that a very simple and efficient and attractive artificial bait has been provided which is very simple in construction wherein the driving parts are positive in operation and no springs are provided which will become rusted or broken when in use, while the single driving means is sufficient to operate the several legs and tails or fins due to the manner in which the forward members extending above the driving disks are struck by the links which actuate the rear member.

The foregoing description and the drawings have reference to what may be considered the preferred, or approved forms of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent is:—

1. In a device of the character described, the combination of a body, a disk rotatable within said body, means for rotating the disk, movable members pivoted upon said body adjacent the forward and rear portions thereof, the movable members and the forward portion of the body projecting above the disk, link means connected to the disk and to the movable members at the rear portion of the body whereby as the disk is rotated, the link means will swing the movable members at the rear portion of the body and will strike the movable members extending above the disk to cause the movement of all of said movable members, as set forth.

2. In a device of the character described, the combination of a body, a rotatable disk carried within said body, means for rotating said disk, movable members pivoted upon said body and having extensions projecting above said disk, movable members contiguous to the rear portion of said body, link means pivoted upon said disk, pin and slot connections connecting the link means to said movable means at the rear portion of the body, whereby as the disk rotates, said link means will shift the movable means at the rear portion of the body with a jerky motion and will strike the movable means at the forward portion of the body, at intermittent intervals to impart a swinging and jerky motion thereto, as and for the purposes set forth.

3. In a device of the character described, the combination of a body, a disk rotatable within said body, means for rotating said disk, forward legs pivoted upon said body and having extensions projecting above said disk, rear legs including thigh sections pivoted upon said body, calf sections pivoted upon the thigh sections, a link pivoted upon said disk between the extensions of said forward legs, said link having rearwardly and outwardly extending branches having slots therein, pins connected to the thigh sections of said rear legs and extending through said slots, whereby as the disk is rotated, said links will shift the rear legs with a jerky swinging movement and will strike the forward legs to swing the same, as and for the purposes set forth.

4. In a device of the character described, the combination of a body, a disk rotatable within said body and lying in a plane parallel to the longitudinal axis of the body, means for rotating the disk, movable members pivoted upon said body adjacent the forward and rear portions thereof, the movable members in the forward portion of the body provided with extensions projecting above said disk, link means connected to the disk and to the movable members at the rear portion of the body, for swinging the movable members at the rear portion of the body when said disk is rotated, and said links adapted to strike the projecting portions of said movable members carried by the front portion of the body for swinging said last mentioned members.

5. A device of the character described, the combination of a body, a disk rotatable within said body, means for rotating said disk, movable members loosely mounted upon said body adjacent to the forward portion thereof, movable members carried by the rear portion of said body, link means connecting the movable members carried by the rear portion of the body to said disk for actuating said last mentioned movable members as said disk is rotated, and said movable members carried by the forward portion of said body provided with means for engagement with said links, for swinging said movable members carried by the forward portion of the body.

In testimony whereof I affix my signature in presence of two witnesses.

JOHN C. CALDWELL.

Witnesses:
J. W. HUFFMAN,
LAURENCE J. GRIFFIN.